United States Patent [19]
Kato

[11] Patent Number: 5,982,378
[45] Date of Patent: Nov. 9, 1999

[54] SYSTEM AND METHOD FOR MODELING A THREE DIMENSIONAL OBJECT

[75] Inventor: Saul Kato, Palo Alto, Calif.

[73] Assignee: Spatial Technology Inc., Boulder, Colo.

[21] Appl. No.: 08/691,646

[22] Filed: Aug. 2, 1996

[51] Int. Cl.$^6$ .................................................. G06T 17/40
[52] U.S. Cl. ........................................................ 345/430
[58] Field of Search ................................. 345/425, 426, 345/430, 434, 419

[56] References Cited

U.S. PATENT DOCUMENTS

| | | | |
|---|---|---|---|
| 5,129,014 | 7/1992 | Bloomberg | 382/48 |
| 5,490,240 | 2/1996 | Foran et al. | 345/430 |
| 5,495,535 | 2/1996 | Smilansky et al. | 382/145 |
| 5,581,276 | 12/1996 | Cipolla et al. | 345/435 X |
| 5,592,597 | 1/1997 | Kiss | 345/419 |
| 5,745,667 | 4/1998 | Kawase et al. | 345/430 |
| 5,793,372 | 8/1998 | Binns et al. | 345/430 |
| 5,841,441 | 11/1998 | Smith | 345/430 |

OTHER PUBLICATIONS

Litwinowicz et al., Efficient Techniques for Interactive Texture Placement, Computer Graphics, pp. 119–122, Aug. 1994.

Pederson, Decorating Implicit Surfaces, Computer Graphics, pp. 291–300, Aug. 1995.

Breen et al., Predicting the Drape of Woven Cloth Using Interacting Particles, Computer Graphics, pp. 365–372, Aug. 1994.

*Primary Examiner*—Anton Fetting
*Attorney, Agent, or Firm*—Gray Cary Ware & Freidenrich

[57] ABSTRACT

A system for modeling a three dimensional object on a computer system is provided, the system having means for capturing data from an input device, the data representing various points on the surface of the object, means for generating from said captured data a three dimensional model of said object that has first distinct features at predetermined locations on the model, and means for applying a texture map onto said model, the texture having second distinct features at predetermined locations that correspond to the first distinct features of the model, so that a textured model is generated wherein the first distinct features of the texture map are located at approximately the same location as the second distinct features of the model. A method of modeling a three dimensional object is also provided. In addition, a method for mapping a texture map having first distinct features at predetermined locations onto a three dimensional model of an object in a computer system, the model having second distinct features at predetermined locations is provided.

10 Claims, 7 Drawing Sheets

SYSTEM AND METHOD FOR MODELING A THREE DIMENSIONAL OBJECT

BACKGROUND OF THE INVENTION

The invention relates generally to generating representations of a three-dimensional object on a computer screen, and more particularly to a system for modeling the surface of a three-dimensional object using data generated by a surface contour sensing system.

Systems and methods for generating two-dimensional information about a three dimensional object are well known. These well known two-dimensional systems typically use a flat table that has a touch sensitive surface. To generate data for a particular point, a stylus is used to depress the touch-sensitive surface and cause electrical signals to be generated relating to the position of the stylus on the table. These stylus position signals may be used to generate two-dimensional data about the object. These two-dimensional digitizing systems, however, are not suitable for generating data about the surface of three-dimensional objects.

Systems and methods for generating three-dimensional data about an object and for displaying a representation of the object on a computer screen are also well known for such applications as computer aided drafting and machining (CAD/CAM), medical analysis and visualization, and modeling of objects. These well known three-dimensional data generation devices may include either a mechanical probe coordinate measuring machine (CMM), or an optical system. The CMM systems generally use a type of electromechanical probe to contact and follow the surface of the object and generate data relating to the surface of the object along the scan line. The data generation process is repeated for successive scan lines until data is gathered for the entire object. These mechanical probe systems are slow and require expensive, complex, large machines, and require a large amount of processing power to control the mechanical probe and process the scan-line data.

The known optical systems typically use incandescent light or laser light to generate data relating to the surface of the object. In one optical system, light is projected towards the object and the reflected light from the surface of the object is received by a sensor. In another optical system, a video camera is used to form images of an object at various different angles to generate data about the surface of the object. These optical systems can generate data concurrently for a large portion of the object so that the time necessary to generate data for the entire object is reduced. These optical systems, however, are susceptible to misalignment problems that can corrupt the generated data. In addition, these optical systems are expensive, large machines that must be operated by a trained person.

All of these known three-dimensional sensing systems require a system for taking the generated three dimensional data and for generating a model of the surface contour of the three dimensional object. There are a number of known modeling systems that may be used with these sensing system. These known modeling systems are difficult for the average person to use because they are so complex. In addition, these known modeling systems also normally require the processing power of a work station or a high end personal computer, and are very expensive to purchase.

Some of these conventional modeling systems provide some capability for placing a texture map onto a three dimensional object. These conventional texture mapping systems map textures, such as a wood grain or a color, that do not have any specific features, onto a surface of an object. These conventional texture mapping systems cannot map a texture having distinct features, such as a picture of a face, onto a three dimensional model of a human head because these systems cannot handle positioning the texture map sufficiently accurately. In a conventional modeling system, any mapping of a texture with distinct features would be done by hand.

Thus, there is a need for a system and method for modeling the surface of a three dimensional object which avoid these and other problems of known devices, and it is to these ends that the present invention is directed.

SUMMARY OF THE INVENTION

The invention provides a modeling system and method that is fast, inexpensive and does not require a huge amount of processing power. In addition, the invention provides a modeling system that maps textures having distinct features onto a three dimensional object with minimal user input. In addition, the modeling system automatically corrects for user error and any distortions present in the texture.

A modeling system and method in accordance with the invention is provided that has means for capturing data from an input device, the data representing various points on the surface of the object, means for generating from said captured data a three dimensional model of said object that has first distinct features at predetermined locations on the model, and means for applying a texture map onto said model, the texture having second distinct features at predetermined locations that correspond to the first distinct features of the model, so that a textured model is generated wherein the first distinct features of the texture map are located at approximately the same location as the second distinct features of the model. A method of modeling a three dimensional object is also provided. In addition, a method for mapping a texture map having first distinct features at predetermined locations onto a three dimensional model of an object in a computer system, the model having second distinct features at predetermined locations is provided.

DETAILED DESCRIPTION OF A PREFERRED EMBODIMENT

The invention is particularly applicable to a system for generating a texture for a surface of a three-dimensional object. It is in this context that the invention will be described. It will be appreciated, however, that the system and method in accordance with the invention has greater utility.

A device for measuring a characteristic of a three-dimensional object, such as its surface contour, may use an array of sensors to measure the characteristic. Each of these resistive sensors may have a resistance that changes depending on the changing characteristic of the object. For example, a surface of the object that has more height may correspond to a lower resistance of the resistive sensor that is located over that surface. Once the characteristic of the object underneath each sensor is determined, a system and method for modeling the three dimensional object based on the data from the sensor is needed. The invention provides a system and method for modeling a three-dimensional object. To better understand the modeling system and method, a sensing system that may be used with the modeling system and method in accordance with the invention will be described.

Figure 1:
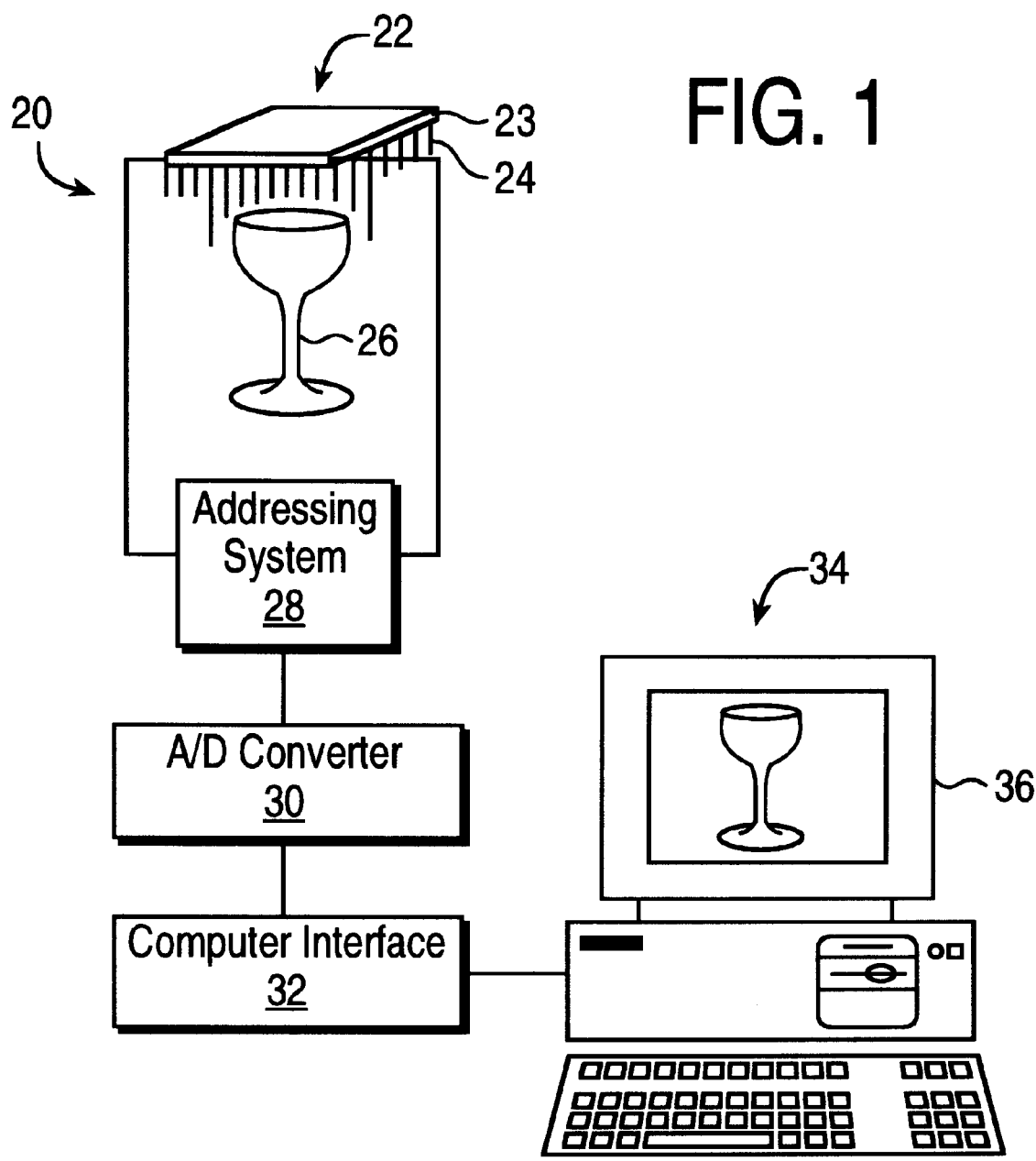
FIG. 1 is a schematic diagram of a sensing system that may be used with the modeling system and method in accordance with the invention.

FIG. 1 is a block diagram of a sensing system 20 that may incorporate an addressing system in accordance with the invention. The sensing system 20 may include a sensing device 22 that may have a frame 23 and a plurality of sensors 24. The sensing device may be used to measure the characteristic of a three dimensional object 26, that may be, for example, a vase. The frame of the sensing device may secure the plurality of sensors into an array of sensors. The sensors may be any type of device that generates a signal proportional to a measured characteristic of an object. Each of the sensors in the array may be addressed by an addressing system 28. The addressing system may also convert the signal of each of the sensors into an analog electrical signal, and the analog electrical signal of the addressing system may be converted to a digital signal by an analog to digital converter (A/D) 30.

The electrical digital output of the A/D converter may be fed into a computer interface 32 that interprets the digital signals and may generate, for example a representation of the object on a computer system 34 that may have a computer display 36. Now, the computer system 34 will be described in more detail.

Figure 2:
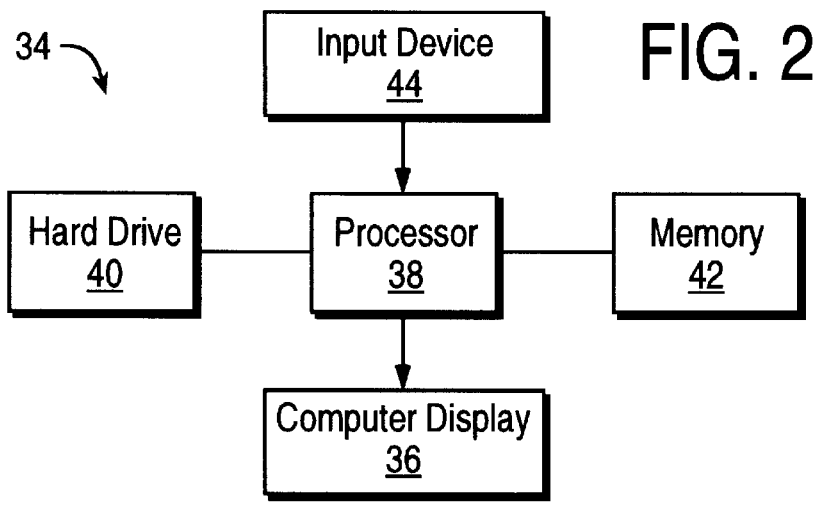
FIG. 2 is a block diagram of a computer system of FIG. 1 that may be used to generate three dimensional images of an object.

FIG. 2 is a block diagram of the computer system 34 that may be used in connection with a modeling system and method in accordance with the invention. In addition to the computer display 36, the computer system may also have a processor 38, a hard disk 40, a memory 42 and an input device 44. The input device may be the sensing device 22 shown in FIG. 1. The processor controls the operations of the computer system by executing instructions that are temporarily stored in the memory 42. The various programs that are made up of these instructions are permanently stored in the hard disk, and then copied to the memory as needed. An example of a program that may be executed by this processor is a modeling system and method in accordance with the invention. In operation, the input device 44 generates data, which is processed by a modeling program being executed by the processor. The output of the modeling system may be stored in the hard disk or may be displayed on the computer display. Thus, the modeling system and the output generated by the modeling system may both be stored on the hard disk. Now, the modeling system and method in accordance with the invention will be described.

Figure 3:
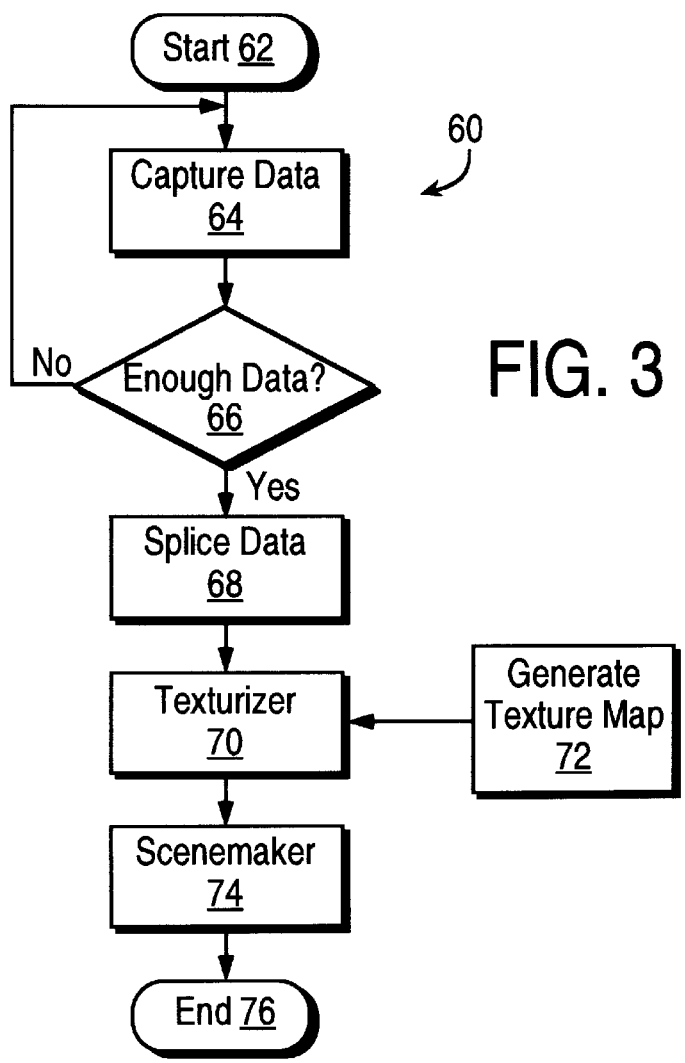
FIG. 3 is a flowchart showing a method in accordance with the invention of modeling a three dimensional object.

FIG. 3 is a flowchart of a modeling system and method 60 in accordance with the invention. The method of modeling a three dimensional object begins at step 62. In step 64, the data from the input device is captured and stored. In step 66, it is determined whether enough data has been captured for the modeling to be completed. If not enough data has been captured, then the capture step 64 is repeated until enough data has been captured and stored. Once there is a sufficient amount of data, in step 68, the pieces of data from the capture step or steps are combined together to form a three dimensional representation of the object. In step 70, a texture may be added to the three dimensional representation in the texturizing step. For example, a digital photograph 72 may be added to add texture to the surface of the object. Then, in step 74, the three dimensional representation may be added into a scene, if desired. Then, in step 76, the method is completed. As shown, the method may be divided into four modules, including the capture step, the splicer step, the texturizer step, and the scenemaker step. The details of the capture, splicer, texturizer and scenemaker steps will be described below. Now, an example of the capture step will be described.

Figure 4:
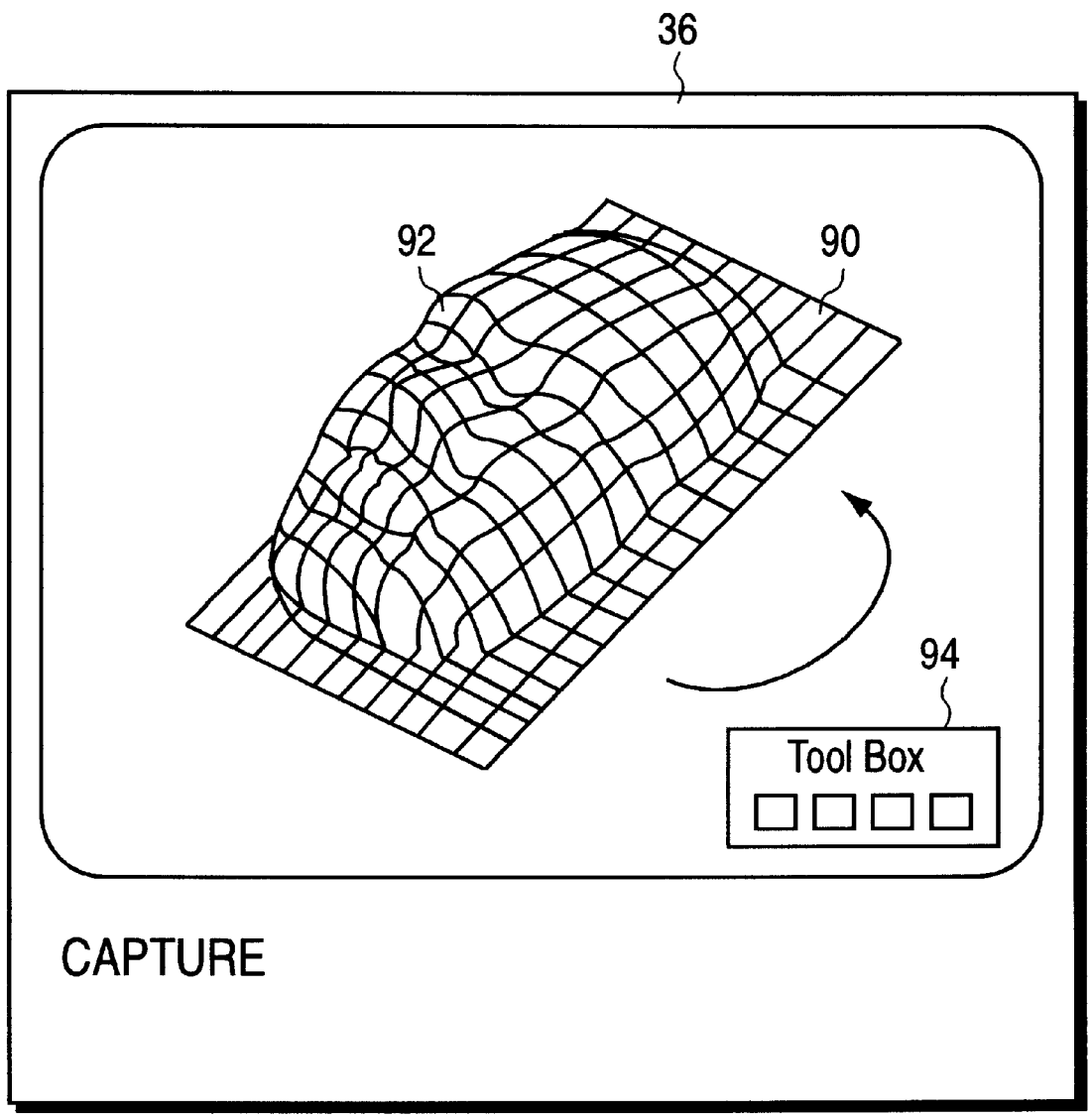
FIG. 4 is a diagram showing a capture step of the modeling method of FIG. 3.

FIG. 4 is a diagram showing a capture step of a modeling system and method in accordance with the invention. As shown, the surface contours of a person's face have been captured. During the capture, a rendered three dimensional surface 90 is generated in real time from the data generated by the input device and displayed on the computer screen 36 by using conventional three dimensional rendering software. In this example, the rendered surface 90 of a face of a person may include, for example, a nose 92. A toolbox 94 may be displayed on the computer screen that may permit a user to modify or rotate the rendered surface. The rendered surface may also be rotated so that the user may see the rendered surface from every angle as the data is being captured. The real time generation of the rendered surface permits the user to capture an animated sequence of rendered surfaces that represent the changing shape of a real object in real time. For example, the changing surface contour of a face of a person while the person is talking may be captured in accordance with the invention. The sequence of rendered surfaces may be stored is a single file or multiple files and may be used by another program or any of the other modules of the modeling system in accordance with the invention as a sequence of files representing different renderings of the three dimensional surface. The capture module may also permit a user to calibrate his input device since rendered surfaces of flat planes with known height may be generated in real time. Now, the splicing module of the modeling system will be described.

Figure 5:
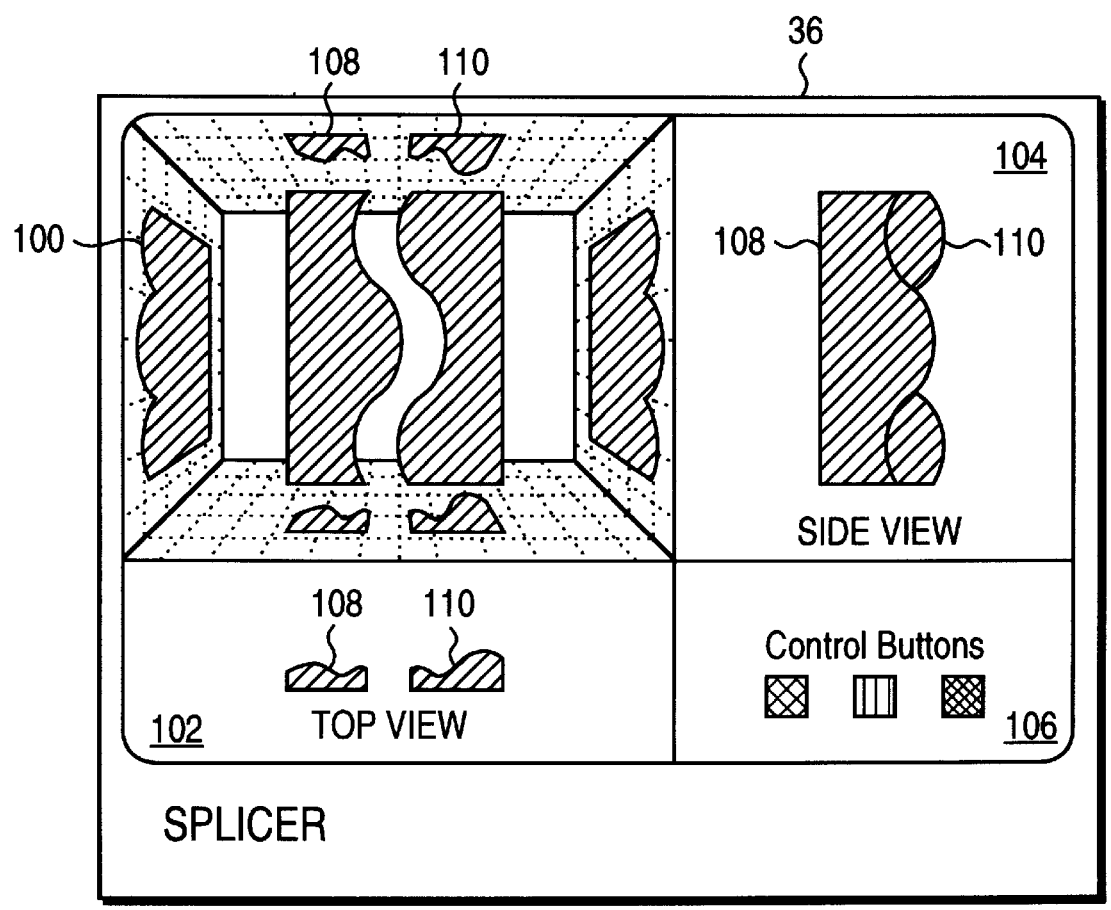
FIG. 5 is a diagram showing a splicing step of the modeling method of FIG. 4.

FIG. 5 is a diagram illustrating a splicing step of a modeling system and method of FIG. 3. The splicer step may preferably have a multi-window display and may have various viewing windows that show various views of the object that are displayed on the computer display 36. The viewing windows displayed by the splicer may include a three dimensional grid box viewing window 100, a top view viewing window 102, and a side view viewing window 104. The splicer also may have a toolbox 106 with control buttons for controlling the views. The splicer shows various views of different three dimensional scans of an object by the capture module. A user may connect or splice two or more of these three dimensional scans together by pointing at the particular scans and moving the scans together to produce an accurate three dimensional model of the object. The splicer permits the careful alignment of the scans in the x, y, and z dimensions all at once, which is known as image registration. For example, as shown, a first surface 108 and a second surface 110 are being aligned.

A number of features of the splicing module permit the accurate image registration. First, as a user moves a surface in one of the viewing windows, the corresponding surfaces in all of the other viewing windows are continuously updated to reflect the changes made by the use in the window. The three dimensional grid box represents the total three dimensional space that the object is going to drawn in, and each surface casts dimensional grid side of the three dimensional grid box to aid in the positioning of the surfaces. The pointer that is displayed in any of the viewing windows may have an x and y position, but may also have a z position, that may be controlled, so that the user can determine the height of the surfaces. Thus, the physical size of the pointer displayed on the computer screen changes according to the assigned z value. Thus, as the pointer in moved down the surfaces towards the bottom of the grid, the pointer looks smaller and smaller. To further aid the use in perceiving the depth of any surface, the displayed pointer also casts a shadow on the side of the grip box.

In addition to these features that help the user accurately register the image, the splicer module also has some automatic image registration systems that may try to correctly image the various surfaces. As an example, the splicer module may moves each surface slightly, computes the least squares sum between points of the two surfaces to be spliced, and then picks the surface position which results in the minimum least squares sum.

Once the surfaces have been spliced together by the splicer module, the complete three dimensional representation of the object may be saved to a file for use with other programs or with other modules in the modeling system. Now, the texturizing module of the modeling system in accordance with the invention will be described.

Figure 6:
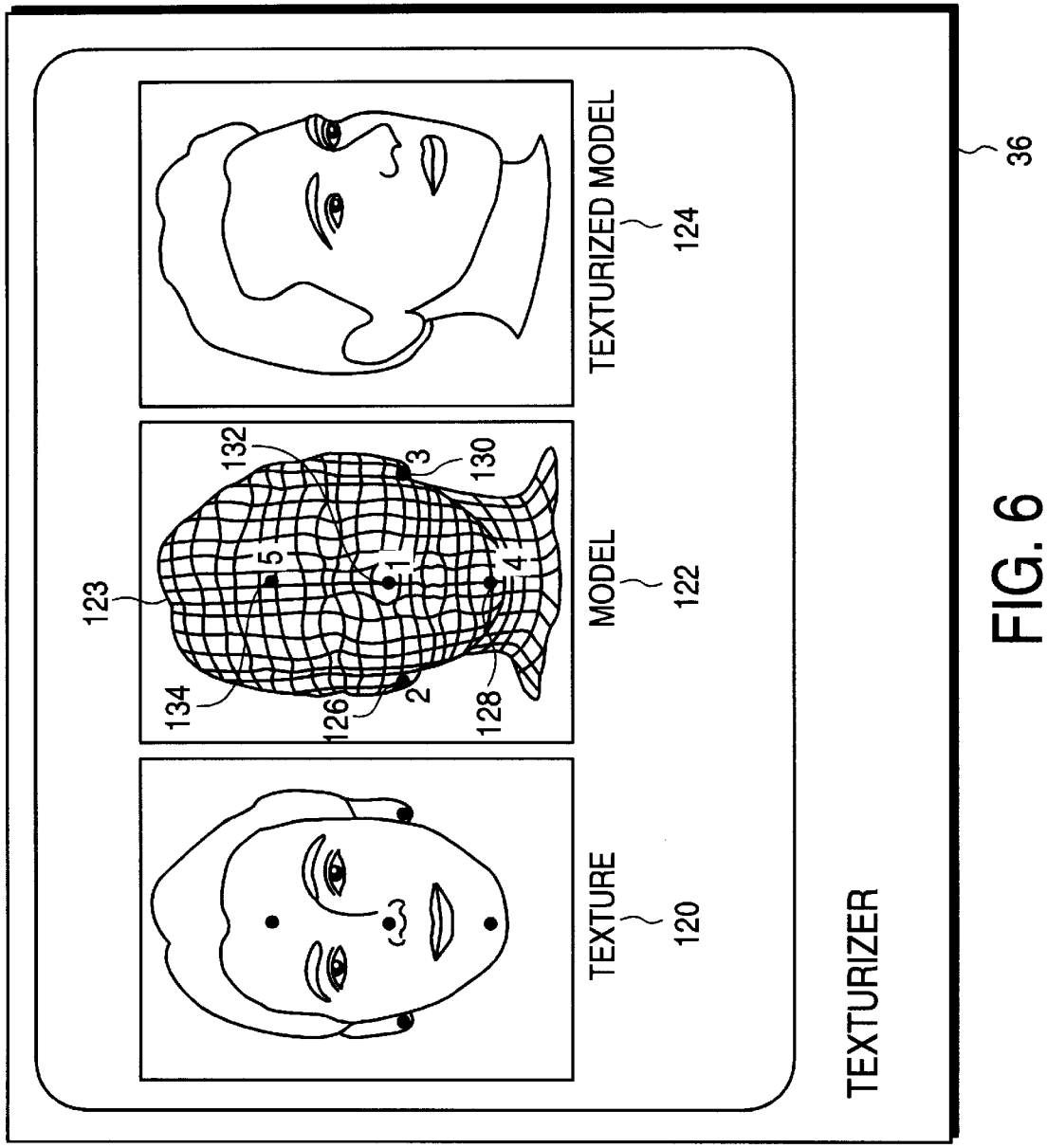
FIG. 6 is a diagram showing a texturizer step of the modeling method of FIG. 4.

FIG. 6 is a diagram illustrating a texturizer step of a modeling system of FIG. 3. The texturizer step may preferably have a multi-window display and may have be displayed on the computer screen 36. The multi-window display may have three windows, that may be a texture window 120, a model window 122, and a texturized model window 124. The texture window may display an image of a texture map. The texture map may be loaded in from a file or may be taken directly from the output of a scanner or a digital camera. The model window 122 shows a rendered three dimensional model 123, that may be generated by the splicer module, described above. In this example, the texture map is a digital picture of a human face, and the model 123 is a three dimensional representation of a human face. The texturized model window 124 shows the texture map placed onto the model to create a fully rendered photorealistic texture mapped three dimensional model. The method of placing the texture map onto the model will be described below.

The user may specify the relative position, orientation, and scaling of the texture map with respect to the three dimensional model using a method in accordance with the invention that makes the texture mapping easier, more intuitive, and more accurate than conventional texture mapping systems. In this method, landmark points are placed on the model, such as points 126–134 by a user who places the landmark points on the model by pointing at the model with a pointing device, such as a mouse, and then corresponding landmark points are placed on the texture map in a similar manner by the user. In this example, the first landmark point 126 has been placed by the user and is located at one ear of the face, the second landmark point 128 is located at the chin of the face, the third landmark point 130 is located at the other ear of the face, the fourth landmark point 132 is located at the tip of the nose of the face, and a fifth landmark point 134 is located on the forehead of the face. Each of these landmark points was placed at the particular location by the user. The method is not limited to any particular number of landmark points and the method becomes more accurate as more landmark points are added. The method of texture mapping will now be described.

Figure 7:
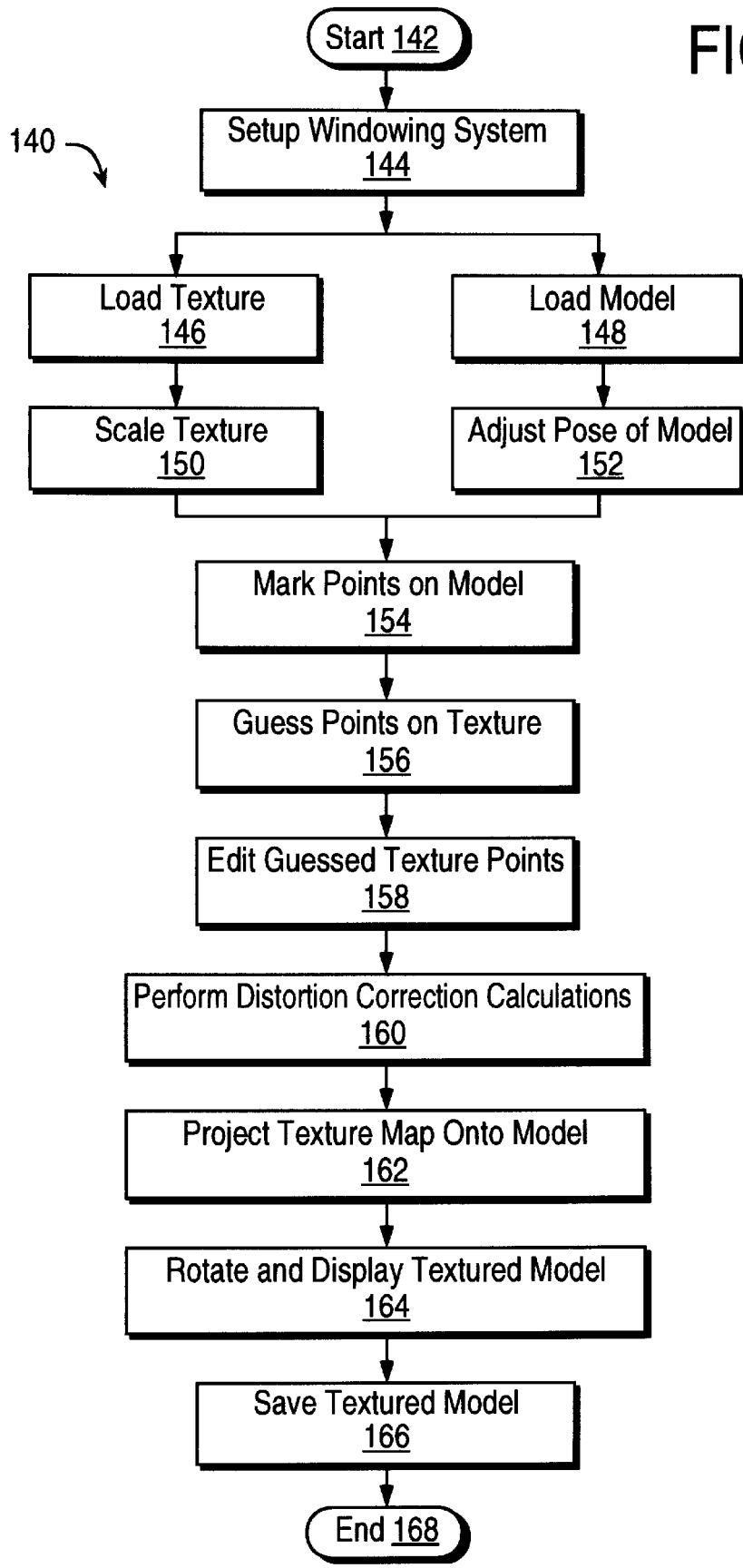
FIG. 7 is a detailed flowchart of a texturizing step of the modeling method in accordance with the invention, shown in FIG. 4.

FIG. 7 is a flowchart showing a method 140 of texturizing a model in accordance with the invention. The method starts at step 142, and then at step 144, the three windows are displayed on the computer display and any other initialization procedures are completed. Then, in steps 146 and 148, the texture and the model, respectively, are loaded into their respective windows. As described above, the texture may be loaded from a file or generated by a scanner or a digital camera, and the model may be generated by the splicer module or may be imported from another modeling system. In step 150, the texture is scaled so that the texture is the same size as the model onto which it will be mapped. In step 152, the orientation of the model is adjusted by the user who may point and click the pointer over the model window to rotate the model into a correct orientation, in which the normal vector of the texture map is aligned with the normal vector of a surface of the three dimensional model. Once these two steps are completed, the landmark points on the model and texture may be defined.

In step 154, the user, using a pointing device, such as a mouse, selects landmark points on the model, as shown in FIG. 6. Then, in step 156, the user may point and click to select the estimated landmark points on the texture that correspond to the previously selected landmark points on the model. Then, in step 158, the landmark points estimated or guessed by the user may be corrected by the modeling system to correct any inaccuracies and minimize the effect of user error in picking the estimated corresponding landmark points on the texture. Then, in step 160, distortion correction calculations are performed by the modeling system.

The user error minimization procedure and the distortion correction will now be described. The error minimization and distortion correction permit the modeling system to efficiently and accurately map a texture with distinct features, such as a face, onto a three dimensional model with corresponding distinct features. For example, a digital photograph of a face of a person may be mapped onto a three dimensional model of a human head to provide a photorealistic three dimensional representation of a human head and face.

The problems associated with mapping a texture having distinct features onto a three dimensional model having distinct features are numerous. First, the user does not the exact orientation, scale or displacement of the texture map relative to the model. The only information that the user really knows is where the location of certain distinct features on the texture should be placed on the model. Second, most texture maps are generated from a digital photograph, a digital video, or a scanned photograph and this means that the texture has some distortions due to lens and aperture distortions inherent in the camera taking the photograph. These distortions are difficult for a user to correct since they involve complex mathematical formulas. These error correction and distortion correction methods described below permit the user to simply select visual landmark points on the texture and the model, and the modeling system automatically performs any corrections needed.

To correct for user errors in selecting the corresponding landmark points on the texture, three landmark points on the model and the three corresponding landmark points of the texture are selected, and the x,y scale factors and x,y offset factors are calculated. For example, if the three landmark points selected on the texture are (tx1,ty1), (tx2,ty2), and (tx3,ty3), and the three on the model are (mx1, my1), (mx2, my2), and (mx3,my3) then the x,y scale factors between the first two points may be sx1,2=(tx2−tx1)/(mx2−mx1) and sy1,2=(ty2−ty1)/(my2−my1), respectively. The values for sx1,3 and sy1,3 may also be calculated in a similar manner. Similarly, the x,y offset factors for the first two points may be offset_x1=[{tx1*[(mx2−mx1)$^2$+(mx3−mx1)$^2$]}/{sx1,2*(mx2−mx1)$^2$+sx1,3* (mx3−mx1) $^2$}]−mx1, and offset_y1= [{ty1*[(my2−my1)$^2$+(my3−my1)$^2$]}/{sy1,2*(my2−my1)$^2$+sy1,3*(my3−my1)$^2$}] −my1, for example. The particular calculations may be changed. The values of the scale and offset factors may be averages over local regions of the texture and the model to minimize the user error. The scale factors may be preferably weighted with respect to distance between the pairs because the scaling is more accurate over larger distances. The averaging and weighted averaging tends to remove the stochastic error introduced by the user not accurately selecting the landmark points, and also factors in successive landmark points to make the overall texture mapping more precise.

To correct for distortion, local offset and scale values are calculated for a number of regions in the texture map. For example, the local scale and offset values may be calculated for five non-overlapping regions in the texture map, such as a region at each corner of the rectangular texture map, and a region at the center of the texture map. Then, a known interpolation technique, such as bilinear, spline-based, conic, or any other suitable interpolation, may be used to create an Offset map and a Scale map that correspond to the texture map. The Scale and Offset maps may have an array of values, associated with each pixel in the texture map, that represent a virtual inverse lens used to correct distortion. Now, a known affine transformation may be applied to the texture, based on the local error-corrected values to compensate for lens distortion that may have occurred to the texture if the texture is a digital picture from a digital camera. The affine transformed texture may then be mapped by well known techniques, to generate an error corrected texture map.

The user may select additional landmark points on the texture and on the model which, in conjunction with the automatic error correction, described above, may further improve the accuracy of the alignment of the texture with the three dimensional model. After any additional landmark points or error correction, in step 162, the distortion corrected texture map is projected onto the model, the model is rotated and a texturized model is displayed, in step 164, in the texturized model window 124, as shown in FIG. 6. In step 166, the textured model may be saved to a file. The method ends at step 168. Now, the scenemaker module of the modeling system and method in accordance with the invention will be described.

Figure 8:
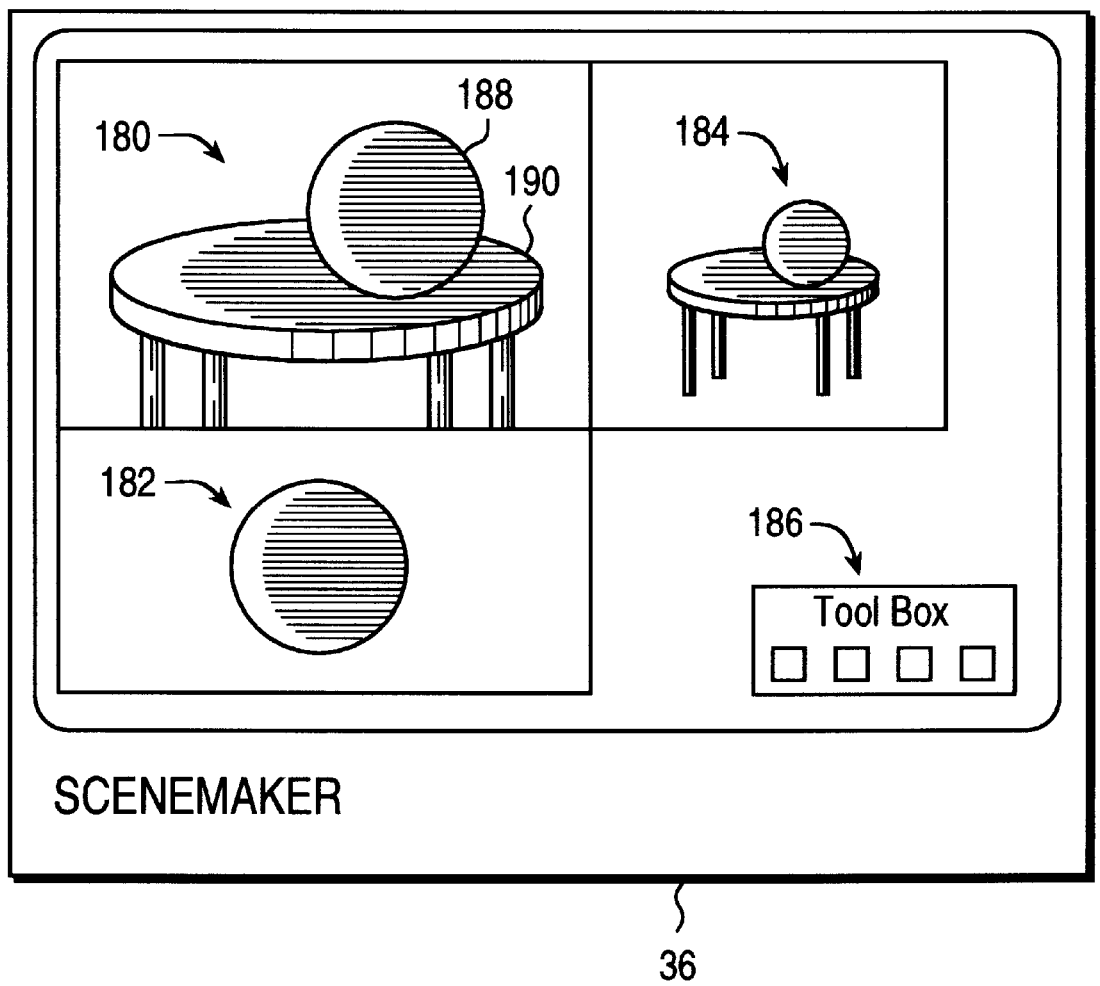
FIG. 8 is a diagram showing a scenemaker step of the modeling method of FIG. 4.

FIG. 8 illustrates a scenemaker module of a modeling system and method of FIG. 3. As shown, the scenemaker module may display a number of windows on the computer display 36 that may include a close-up three dimensional viewing window 180, a top view viewing window 182, and a far three dimensional viewing window 184. The scenemaker module may also display a toolbox 186 that may be used to manipulate any of the objects shown in the scene. The objects may be loaded into the scenemaker module from a file and may be positioned by the user using a mouse. The location of the cameras, lights, etc., as described below, may be positioned by the user using the mouse. In the example shown, a ball 188 has been positioned by the user so that the ball is resting on a table 190.

The scenemaker module is a general scene manipulator and scene renderer that permits the user to add lighting, position cameras, and place three dimensional objects into a scene. The views in the windows may change depending on the positioning of the cameras. In addition, the user may select that a camera be in a flying mode so that the user will view as fly-by animation of the scene. The scene created by the scenemaker module may be saved for later use.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A system for modeling a three dimensional object on a computer system, comprising:

means for capturing data from an input device, the data representing various points on the surface of the object;

means for generating from said captured data a three dimensional model of said object that has first distinct features at predetermined locations on the model;

means for applying a texture map onto said model, the texture having second distinct features at predetermined locations that correspond to the first distinct features of the model, so that a textured model is generated wherein the first distinct features of the model are located at approximately the same location as the second distinct features of the texture map; and means for automatically correcting for errors in the user's locating of the second distinct features of the texture, wherein the correction means further comprises means for correcting user error in selecting landmark points on said model and on said texture map, said user error correction means comprises means for generating a scale factor value from said landmark points and a offset factor value from said landmark points for said texture map to correct said texture map and wherein the error correction further comprises means for correction distortion in said texture map, said distortion correction comprises means for determining the scale factor value and the offset factor value for one or more regions of the texture map, means for interpolating the scale factor values and offset factor values for the one or more regions of the texture map to generate a scale map and an offset map, and means for generating an affine transform for said texture map based on said scale map and the offset map, and means for applying said affine transform to said texture map.

2. The system of claim 1, wherein said applying means further comprises means for selecting a first landmark point on said texture map, the first landmark point corresponding to a first distinct feature on said texture map, means for selecting a second landmark point on said model, said second landmark point corresponding to a second distinct feature on the model, the second distinct feature corresponding to the first distinct feature of the texture map, means for generating a texture map based on said landmark points, and means for correcting said texture map based on said landmark points.

3. The system of claim 1 further comprising means for combining said textured model into a scene.

4. The system of claim 1, wherein said one or more regions in the texture map are non-overlapping regions.

5. A method for modeling a three dimensional object on a computer system, comprising:

provding data to a computer system from an input device, said data representing various points on the surface of the object;

splicing said data together to form a three dimensional model of said object, said model having first distinct features at predetermined locations;

providing a texture map having second distinct features at predetermined locations, the second distinct features corresponding to the first distinct features on the model; and mapping said texture map onto said model so that the second distinct features of said texture map are aligned with the corresponding second distinct features of the model to generate a textured model, wherein said mapping further comprises selecting a first landmark point on said texture map, the first landmark point corresponding to a first distinct feature on said texture, selecting a second landmark point on said model, said second landmark point corresponding to a second distinct feature on the model, the first distinct feature corresponding to said second distinct feature, and generating a texture map based on said landmark points, and correcting said texture map based on said landmark points; and automatically correcting for errors in the user's locating of the second distinct features of the texture, wherein said correction further comprises correcting user error in selecting said landmark points on said texture map and said model, said user error correction comprises generating a scale factor value from said landmark points and a offset factor value from said landmark points for said texture map and wherein said correction further comprises correcting distortion in said texture map, said distortion correction comprises determining the scale factor value and the offset factor value for one or more regions of the texture map, interpolating the scale factor values and offset factor values for the one or more regions of the texture map to generate a scale map and an offset map, and generating an affine transform for said texture map based on said scale map and the offset map, and applying said affine transform to said texture map.

6. The method of claim 5 further comprising combining said textured model into a scene.

7. A method for mapping a texture map having first distinct features at predetermined locations onto a three dimensional model of an object in a computer system, the model having second distinct features at predetermined locations, the method comprising:

selecting a first landmark point at a location of a first distinct feature on said texture map;

selecting a second landmark point at a location of a second distinct feature of said model, the second landmark point corresponding to said first landmark point;

correcting the location of said first and second landmark points to generate error-corrected landmark points, the correcting further comprising correcting distortion in said texture map, said distortion correction comprises determining the scale factor value and the offset factor value for one or more regions of the texture map, interpolating the scale factor values and offset factor values for the one or more regions of the texture map to generate a scale map and an offset map, and generating an affine transform for said texture map based on said scale map and the offset map, and applying said affine transform to said texture map; and mapping said texture map onto said object based on said error corrected landmark points so that a textured model is generated wherein the first distinct features of the texture map are located at approximately the same location as the second distinct features of the model.

8. The method of claim 7, wherein said correction further comprises correcting user error in selecting landmark points, said user error correction comprises generating a scale factor value based on said landmark points and an offset factor value based on said landmark points for said texture map to correct said texture map.

9. The method of claim 8, wherein generating said scale factor comprises generating a weighted average of the landmark points, and said generating said offset factor value comprises generating an average of said landmark points.

10. The method of claim 7, wherein said one or more regions in the texture map are non-overlapping regions.

* * * * *